(12) United States Patent
Noda et al.

(10) Patent No.: US 7,565,234 B2
(45) Date of Patent: Jul. 21, 2009

(54) AUTOMOTIVE COLLISION MITIGATION APPARATUS

(75) Inventors: Kazuhiro Noda, Nagoya (JP); Yosuke Ito, Kariya (JP); Kazuma Hashimoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/216,739

(22) Filed: Jul. 10, 2008

(65) Prior Publication Data

US 2009/0018740 A1  Jan. 15, 2009

(30) Foreign Application Priority Data

Jul. 12, 2007  (JP) .............................. 2007-183474

(51) Int. Cl.
*G01S 13/93* (2006.01)

(52) U.S. Cl. .............................. 701/70; 701/78; 701/96; 701/301

(58) Field of Classification Search .................... 701/70, 701/71, 76, 78, 83, 96, 300, 301; 303/125, 303/155; 180/175, 176, 177; 340/903, 435, 340/436
See application file for complete search history.

(56) References Cited

U.S. PATENT DOCUMENTS 6,292,753 B1 * 9/2001 Sugimoto et al. ........... 701/301
6,473,681 B1 * 10/2002 Eckert et al. ................ 701/70
7,018,004 B2 * 3/2006 Chen et al. .................. 303/193
7,418,346 B2 * 8/2008 Breed et al. ................. 701/301
7,426,437 B2 * 9/2008 Breed et al. ................. 701/301

FOREIGN PATENT DOCUMENTS

| JP | A-05-105046 | 4/1993 |
| JP | A-06-107141 | 4/1994 |
| JP | A-09-286313 | 11/1997 |
| JP | A-2004-284422 | 10/2004 |
| JP | A-2005-238992 | 9/2005 |

* cited by examiner

*Primary Examiner*—Richard M. Camby
(74) *Attorney, Agent, or Firm*—Posz Law Group, PLC

(57) ABSTRACT

A collision mitigation controller drives a target brake to be controlled for assisting driver's collision-avoidance operation when a calculated collision time is less than an automatic brake a1 judgment line which is determined in advance. The controller drives the automatic brake a1 in order to mitigate damage generated by a collision with an obstacle or another vehicle when the collision time is less than an automatic brake a2 judgment line which is also less than the automatic brake a1 judgment line. The controller decreases the braking force for the automatic brake a2 when judged that the automatic brake a1 is not driven, as compared with the judgment where the automatic brake a1 is driven. When the automatic brake a2 drives the target brake, it is possible to avoid a collision where own vehicle is struck from behind by the rear vehicle which runs on a same traffic lane.

12 Claims, 6 Drawing Sheets

AUTOMOTIVE COLLISION MITIGATION APPARATUS

CROSS-REFERENCE TO RELATED APPLICATION

This application is related to and claims priority from Japanese Patent Application No. 2007-183474 filed on Jul. 12, 2007, the contents of which are hereby incorporated by reference.

BACKGROUND OF THE INVENTION

1. Field of the Invention

The present invention relates to an automotive collision mitigation apparatus, to be mounted to an automotive vehicle, for mitigating damage generated when a vehicle collides with an obstacle or a vehicle.

2. Description of the Related Art

There has been proposed an automotive collision mitigation apparatus mounted to an automobile vehicle capable of mitigating damage caused by colliding with an obstacle or another vehicle. For example, Japanese patent laid open publication No. JP 2004-284422 has disclosed a related-art collision mitigation apparatus mounted to an automobile vehicle. The related-art collision mitigation apparatus is capable of detecting obstacles which are present on a driving road, and operating a warning brake and providing a warning signal in order to warn the driver of the automobile vehicle when there is a high possibility of collision with the detected obstacle. The related-art automotive collision mitigation apparatus disclosed in JP 2004-284422 drives a collision mitigation brake in order to mitigate the damage of the collision when own vehicle more approaches the detected obstacle.

In such a related-art automotive collision mitigation apparatus, there is a possibility that the collision mitigation brake operates without driving the operation of the warning brake when another vehicle suddenly rushes out to the side of own vehicle or an operation error occurs in the automotive collision mitigation apparatus. In general, because the collision mitigation brake has a large braking force rather than that of the warning brake, there is a possibility that even if own vehicle escapes the collision with the detected obstacle own vehicle is struck from behind by an approaching vehicle (or a rear vehicle which is running behind own vehicle on a same traffic lane) when the collision mitigation brake operates without operating the warning brake.

SUMMARY OF THE INVENTION

It is an object of the present invention to provide an automotive collision mitigation apparatus to be mounted to an automobile vehicle capable of mitigating damage generated when own vehicle collides with an obstacle or a vehicle. In particular, the automobile collision mitigation apparatus according to the present invention can avoid that own vehicle is struck from behind by a rear vehicle which runs behind own vehicle when the brake of own vehicle is driven.

To achieve the above purposes, the present invention provides an automobile collision mitigation apparatus mounted to an automobile vehicle. The automobile collision mitigation apparatus drives a brake means in order to mitigate damage generated when the vehicle collides with obstacles including other vehicles. The collision mitigation apparatus has an obstacle detection means, a collision time calculation means, a collision avoidance assist means, a collision damage mitigation means, an operation judgment means, and damage mitigation braking force reduction means.

The obstacle detection means is configured to detect obstacles present around own vehicle to which the automobile collision mitigation apparatus is mounted. The collision time calculation means is configured to calculate a collision time. This collision time is as an estimated time length until own vehicle collides with the target obstacle detected by the obstacle detection means. The collision avoidance assist means is configured to drive the brake means in order to assist the collision avoidance operation by a driver of the automobile vehicle when the collision time is less than a predetermined assist time which is determined in advance.

The collision damage mitigation means is configured to drive the brake means in order to mitigate the damage to be generated when own vehicle collides with the obstacle when the collision time is less than a predetermined damage mitigation time which is less than the predetermined assist time.

The operation judgment means is configured to judge whether or not the collision avoidance assist means drives the brake means. The damage mitigation braking force reduction means is configured to decrease the braking force of the brake means by the collision damage mitigation means when the operation judgment means judges that the collision assist avoidance means does not drive the brake means, as compared with the judgment where the collision assist avoidance means does drive the brake means.

According to the automobile collision mitigation apparatus according to the present invention, it is possible to avoid a collision in which own vehicle is struck from behind by the rear vehicle when the brake means operates because the automobile collision mitigation apparatus can decrease the breaking force set by the collision damage mitigation means even if the braking is performed by the collision damage mitigation means without performing the breaking by the collision avoidance assist means.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodi-

Embodiment

A description will be given of an automotive collision mitigation apparatus according to an embodiment of the present invention.

Figure 1:
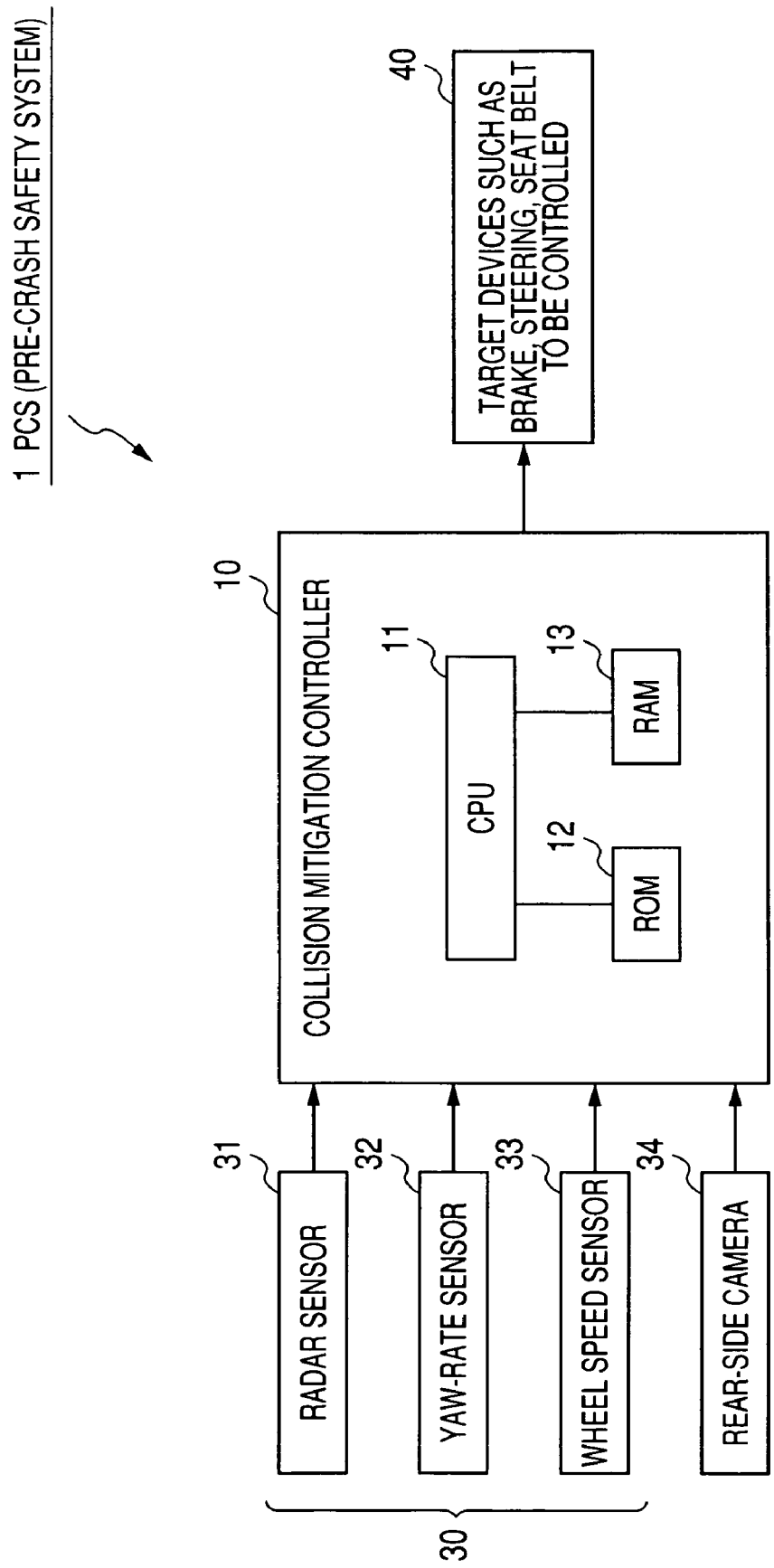
FIG. 1 is a block diagram showing a schematic configuration of a pre-crash safety system (PCS) as an automotive collision mitigation apparatus according to an embodiment of the present invention.

FIG. 1 is a block diagram showing a schematic configuration of a Pre-Crash Safety system (PCS) as the automotive collision mitigation apparatus according to an embodiment of the present invention.

The PCS 1 as the automotive collision mitigation apparatus mounted to own vehicle according to the embodiment is capable of predicting a collision of occurrence with obstacles or another vehicle, and capable of mitigating the damage generated by the collision. The PCS 1 is mounted to an automotive vehicle.

As shown in FIG. 1, the PCS 1 is comprised of a collision mitigation controller 10, various types of sensors 30, a rear-side camera 34 (as a rear vehicle detection means), and target devices 40 such as a brake (or a brake means), a steering (or a steering means), and a seat belt. The collision mitigation controller 10 receives detection signals and data from those devices and controls the operation of the target devices 40.

The PCS 1 mounted to the automotive vehicle is equipped with the various types of sensors 30 such as a radar sensor 31 (as an obstacle detection means), a yaw-rate sensor 32, and a wheel speed sensor 33. The radar sensor 31 is capable of detecting objects (as obstacles) such as pedestrians, obstacles on a road, and other vehicles. The radar sensor 31 has a function to detect a distance between the radar sensor 31 (namely, own vehicle) and the obstacles. The yaw-rate sensor 32 is capable of detecting a turning angular velocity of own vehicle.

Those sensors 31 to 33 generate and transfer detection signals to the collision mitigation controller 10.

The radar sensor 31 periodically performs the detection of obstacles and vehicles in the forward direction of own vehicle at a predetermined cycle, for example, every 100 ms.

The rear-side camera 34 is placed at the rear side of own vehicle in order to observe the vehicles which run behind own vehicle.

The collision mitigation controller 10 receives the image data photographed by and transferred from the rear-side camera 34. The collision mitigation controller 10 performs an image processing of the received image data in order to judge whether or not there is another rear vehicle behind own vehicle in the scanning zone of the rear-side camera 34. In particular, this scanning zone of the rear-side camera 34 is the traffic lane on which own vehicle is running.

Figure 2:
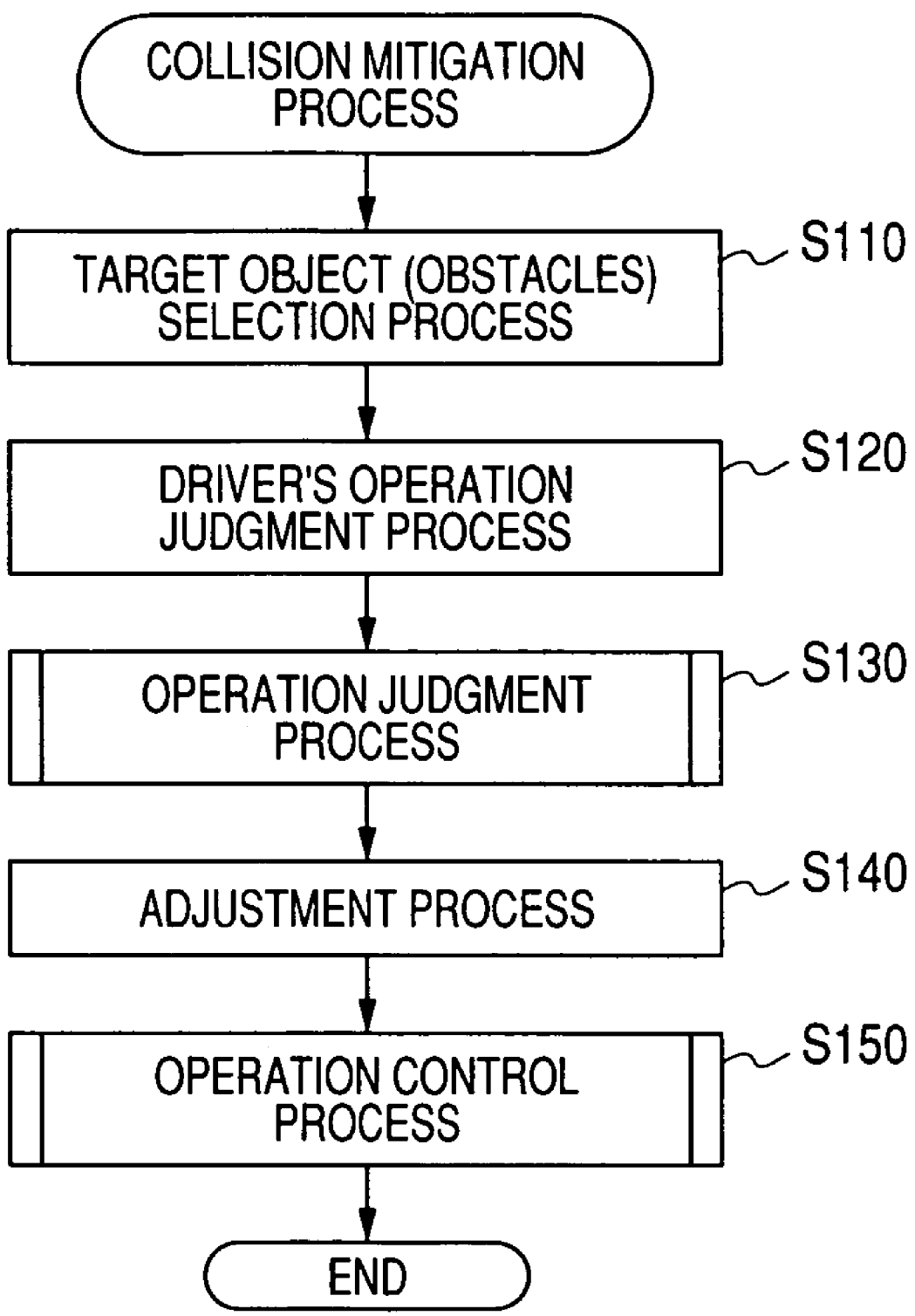
FIG. 2 is a flow chart of a collision mitigation process performed by the automotive collision mitigation apparatus according to the embodiment shown in FIG. 1.

The collision mitigation controller 10 is comprised of a widely-known microcomputer having a central processing unit (CPU) 11, a read only memory (ROM) 12, a random access memory (RAM) 13, and the like. The collision mitigation controller 10 performs various control programs stored in the ROM 12 based on detected results or detection signals transferred from the various types of sensors 30 (the radar sensor 31, the yaw-rate sensor 32, and the wheel speed sensor 33. A collision mitigation process shown in FIG. 2 is one of the various control programs stored in the ROM 12.

The collision mitigation controller 10 performs those control programs, and controls the operation of the target devices 40 such as a brake based on the processing results. This enables the damage generated by the collision with obstacles to be mitigated.

There are a brake, a steering, a seat belt and the like as the target devices 40 which are controlled by the collision mitigation controller 10. The following explanation will describe a case in which the target devices 40 are brake devices in the automotive vehicle.

The collision mitigation controller 10 in the PCS 1 according to the embodiment of the present invention gives the driver of the automotive vehicle various warnings warning of danger, a possibility of collision with another vehicle or obstacles. There is a warning brake (as an automatic brake a1 or a collision avoidance assist means) and a damage mitigation brake (as an automatic brake a2 or a collision damage mitigation means). The warning brake assists the driver to operate the collision avoidance operation. The damage reduction brake assists the driver to reduce the damage generated by the collision with the obstacle.

Because the automatic brake a1 as the warning brake is a brake to inform the warning to the driver, and to assist the driver's collision avoidance operation, the automatic brake a1 operates at a small deceleration speed when compared with the automatic brake a2 as the collision damage mitigation brake. That is, the deceleration speed of the automatic brake a1 is smaller than the deceleration speed (as an acceleration speed with an inverted sign) of the automatic brake a2. On the other hand, when the CPU 11 instructs the automatic brake a2 as the collision damage mitigation brake to operate, the automatic brake a2 immediately operates with its maximum braking magnitude in order to reduce the damage as large as possible. There is also a possibility that the CPU 11 instructs the automatic brake a2 to operate at a small deceleration speed.

When driving the target devices 40 such as the automatic brake a1 as the warning brake and the automatic brake a2 as the collision damage mitigation brake, the CPU 11 transfers the control signals to those brakes a1 and a2 so that each brake generates the deceleration which is determined in advance.

The PCS 1 according to the embodiment of the present invention also has a function as a Predictive Brake Assist (PBA) which is capable of further increasing the braking force when the driver of the automotive vehicle operates the brake when there is a possibility that own vehicle could collide with an obstacle.

Specifically, in a case where there is a high possibility that own vehicle collides with the obstacle, the PBA has the function to increase the oil pressure for the brake and to narrow the interval between a brake pad and a brake disk in the brake before the driver operates the brake devices 40 (such as the brake). This can generate the strong braking force as soon as possible when the driver of own vehicle operates the brake. An actual operation timing of the PBA will be explained later in the explanation for the assist process.

A description will now be given of the collision mitigation process using the automatic brakes a1 and a2 with reference to FIG. 2, FIG. 3, FIG. 4 and FIG. 6.

Figure 3:
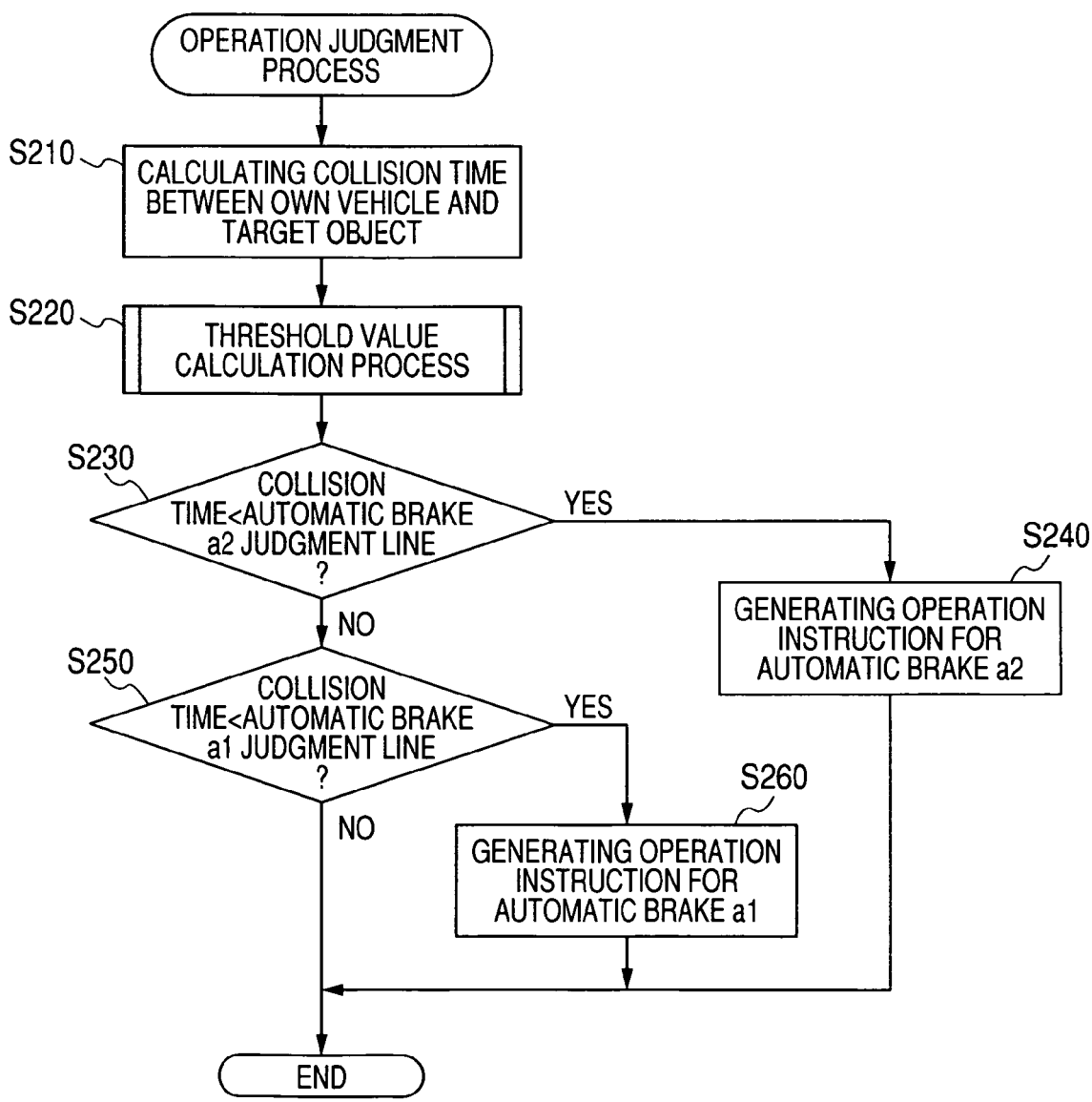
FIG. 3 is a flow chart of an operation judgment process in the collision mitigation process shown in FIG. 2.
Figure 4:
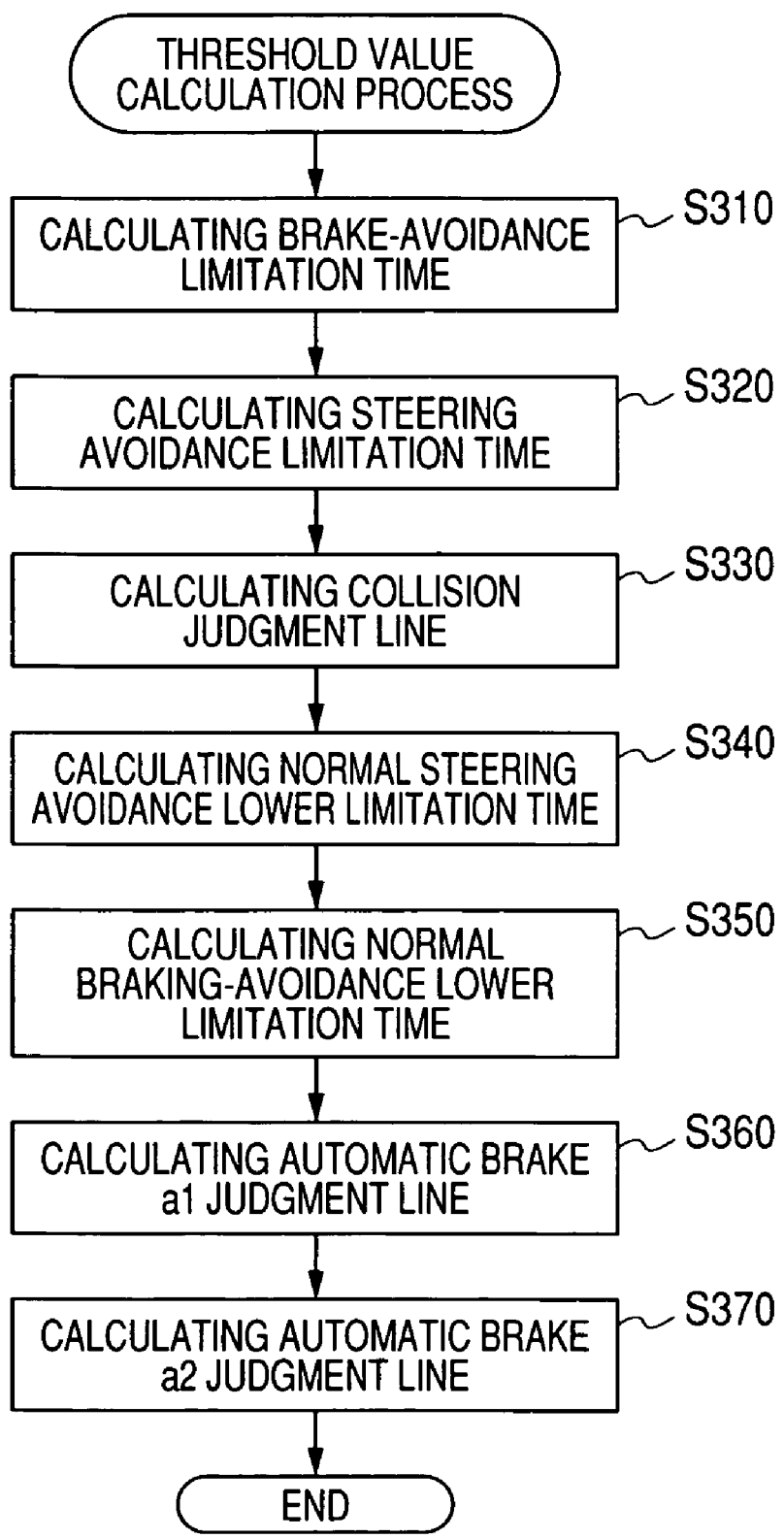
FIG. 4 is a flow chart of a threshold value calculation process in the operation judgment process shown in FIG. 3.
Figure 6:
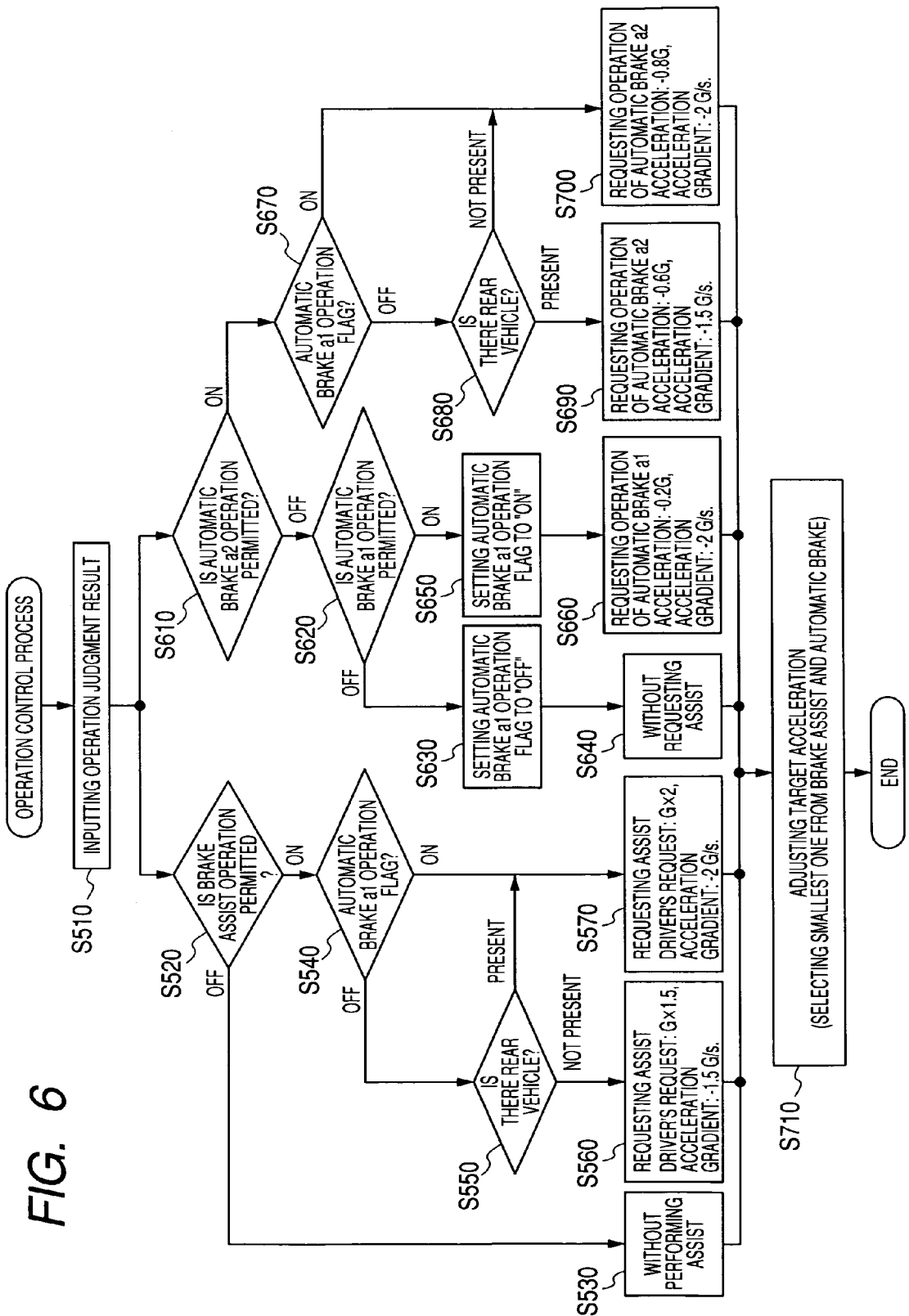
FIG. 6 is a flow chart of an operation control process in the collision mitigation process shown in FIG. 2.

FIG. 2 is a flow chart of a collision mitigation process performed by the CPU 11 in the automotive collision mitigation apparatus according to the embodiment shown in FIG. 1. FIG. 3 is a flow chart of an operation judgment process in the collision mitigation process shown in FIG. 2. FIG. 4 is a flow chart of a threshold value calculation process in the operation judgment process shown in FIG. 3. FIG. 6 is a flow chart of an operation control process in the collision mitigation process shown in FIG. 3.

At a predetermined period of time (for example, approximately, every 50 ms) the PCS 1 as the automotive collision mitigation apparatus repeatedly performs the collision mitigation process shown in FIG. 2.

As shown in FIG. 2, the collision mitigation process is comprised of a target object selection process (at step S110 using a relative speed detection means), a driver's operation judgment process (at step S120), the operation judgment process (at step S130), an adjustment process (at step S140), and the operation control process (at step S150). Those steps S110, S120, S130, S140, and S150 are executed in order.

In the target object selection process at step S110, the PCS 1 detects the presence of another vehicle which comes into the traffic lane on which own vehicle equipped with the PCS 1 is now running, and also detects the presence of objects such as pedestrians and obstacles on the same traffic lane.

In the target object selection process at step S110, the PCS 1 estimates the direction of travel or movement of the objects. Further, the PCS 1 (also acting as the relative speed detection means) further calculates a relative speed between the objects and own vehicle based on the detection result of the radar sensor 31. Finally, the PCS 1 selects the target object having a high possibility of collision with the own vehicle.

In the driver's operation judgment process at step S120, the PCS 1 judges whether or not the driver of own vehicle (automotive vehicle) has performed the collision avoidance operation of escaping from the target object. Specifically, the PCS 1 detects the evidence to operate the brake, for example. When the detection result indicates that the driver has performed the collision avoidance operation, the PCS 1 stores the judgment result into the RAM 13 as the memory.

In the operation judgment process at step S130, the PCS 1 judges whether or not it is the timing to drive the target devices 40 (such as the brakes) based on the direction of movement of the target object which is estimated in the object selection process at step S110. When it is the timing to operate the target devices 40, the PCS 1 generates an operation instruction, and then stores the generated operation instruction into the RAM 13.

In the adjustment process at step S140, the PCS 1 performs the final decision whether or not to actually drive the target devices 40.

In the operation control process at step S150, the PCS 1 transfers the operation instruction stored in the RAM 13 to the target devices 40 corresponding to the operation instruction.

Next, a description will now be given of the operation judgment process at step S130 in detail with reference to FIG. 3. The adjustment process at step S140 and the operation control process at step S150 will be explained later in detail.

As shown in FIG. 3, at step S210 in the operation judgment process (corresponding to step S130 shown in FIG. 2), the PCS 1 (also acting as a collision time calculation means) calculates a collision time counted from the present time to the time at which own vehicle collides with the target object based on the behavior and relative speed of the target object detected in the object selection process at step S110 shown in FIG. 2.

The PCS 1 then performs the threshold value calculation process at step S220 in which a threshold value is calculated. The threshold value becomes the criteria or standard in judgment whether or not the automatic brake (as a brake means) operates.

The operation flow goes to the subroutine for threshold value calculation process shown in FIG. 4.

In the threshold value calculation process shown in FIG. 4 (corresponding step S220 shown in FIG. 3), the PCS 1 firstly calculates a brake-avoidance limitation time at step S310. This brake-avoidance limitation time is the limitation time within which it is possible to avoid collision with the target object using the brake means. Accordingly, it becomes impossible to avoid the above collision only by the driver's operation of the brake even if the driver operates the brake as the brake means after the brake-avoidance limitation time is elapsed.

In general, the brake-avoidance limitation time is a relatively large value in proportion to the relative speed between own vehicle and the target object. The correct brake-avoidance limitation time is experimentally obtained for each vehicle. However, the PCS 1 can roughly calculate this brake-avoidance limitation time using a function whose variable is the relative speed.

This function can be expressed by multiplying the relative speed between own vehicle and the target object by a constant value (for example, approximately, 0.016 which is determined in advance according to the deceleration speed obtained by the brake of each vehicle), where the constant value is changeable according to the vehicle driving condition such as a coefficient of friction of the driving road on which own vehicle is running.

Next, the PCS 1 calculates a steering avoidance limitation time at step S320. This steering avoidance limitation time is a limitation time for own vehicle to avoid the collision with the target object by driving a steering apparatus by the driver. Accordingly, it becomes impossible for own vehicle to avoid the collision with the target object even if the steering apparatus is driven by the driver after the steering avoidance limitation time is elapsed.

The correct steering avoidance limitation time is a constant value regardless of the relative speed of own vehicle and the target object. The correct steering avoidance limitation time is experimentally obtained for every vehicle. However, the PCS 1 can roughly use this steering avoidance limitation time as the constant value. For example, the steering avoidance limitation time becomes a fixed constant value such as 0.6 seconds which is obtained based on the steering function (a response characteristic and a radius of rotation of the vehicle).

Next, the PCS 1 calculates a collision judgment line at step S330.

This collision judgment line is a limit line to avoid the occurrence of collision by the brake (as the brake means) or the steering (as the steering means). Specifically, the PCS 1 selects the smallest one of the brake-avoidance limitation time and the steering avoidance limitation time as the collision judgment line.

Accordingly, it becomes impossible for own vehicle to avoid the collision with the target object after the collision judgment line is elapsed.

Following, the PCS 1 calculates a normal steering-avoidance lower limitation time at step S340. This normal steering-avoidance lower limitation time is the time necessary for own vehicle to avoid the collision with the target object by the driver's normal steering operation. In the embodiment, a fixed value (for example, 1.4 seconds) is used as the normal steering-avoidance lower limitation time.

Next, the PCS 1 (also acting as an assist threshold value setting means) calculates a normal braking-avoidance lower limitation time at step S350. This normal braking-avoidance lower limitation time is the time necessary for own vehicle to avoid the collision with the target object by the driver's brake pedal operation.

In general, the normal braking-avoidance lower limitation time takes a large time value according to the relative speed between the own vehicle and the target object. In the embodiment, the normal braking-avoidance lower limitation time is obtained by adding one second (1 sec) to the brake avoidance limitation time.

At step S360, the PCS 1 calculates the setting time for the automatic brake a1 judgment line which becomes a judgment criteria (or standard) whether or not the automatic brake a1 is initiated in operation. In the present invention, this automatic brake a1 judgment line corresponds to an assist time. This assist time is set by adding a response time (for example, 0.8 seconds) to the normal steering-avoidance limitation time, where the response time is the time for the driver to respond to the warning given by the PCS 1. In other words, the automatic brake a1 judgment line is a constant value regardless of the relative speed of own vehicle and the target object.

Following, the PCS 1 (also acting as an operation judgment means and a time changing means) calculates the setting time for an automatic brake a2 judgment line which becomes a judgment criteria (or standard) whether or not the automatic brake a2 is initiated in operation. This automatic brake a2 judgment line-corresponds to a reducing time according to the present invention. For example, when an automatic brake a1 operation flag indicates ON state, this automatic brake a2 judgment line is obtained by adding 0.3 seconds to the collision judgment line. This automatic brake a1 operation flag will be explained later in detail.

On the other hand, when an automatic brake a1 operation flag indicates OFF state, this automatic brake a2 judgment line is obtained by adding 0.5 seconds to the collision judgment line. In other words, the automatic brake a2 judgment line is so set that the automatic brake a2 quickly operates when the automatic brake a1 does not operate.

Each calculation result in the threshold value calculation process is stored in the RAM 13 of the collision mitigation controller 10. After completion of this threshold value calculation process, the operation flow returns to step S230 shown in FIG. 3. At step S230, the PCS 1 judges whether or not the collision time calculated in step S210 is less than the automatic brake a2 judgment line. When the judgment result indicates that the collision time is less than the automatic brake a2 judgment line ("YES" in step S230), the PCS 1 generates the operation instruction for the automatic brake a2 (as the collision damage mitigation means), and then stores the generated operation instruction into the RAM 13 at step S240 shown in FIG. 4. The operation judgment process shown in FIG. 3 is thereby completed.

On the other hand, when the judgment result indicates that the collision time is not less than the automatic brake a2 judgment line ("NO" in step S230), the PCS 1 judges whether or not the collision time calculated in step S210 is less than the automatic brake a1 judgment line at step S250.

When the judgment result in step S250 indicates that the calculated collision time is less than the automatic brake a1 judgment line ("YES" in step S250), the PCS 1 generates the operation instruction for the automatic brake a1 (as the collision avoidance assist means), and then stores the generated operation instruction into the RAM 13. The operation judgment process is thereby completed.

On the other hand, when the collision time is not less than the automatic brake a1 judgment line ("NO" in step S230), the operation judgment process is immediately completed. The operation flow then returns to step S140 in the flow chart shown in FIG. 2.

Next, a description will now be given of the adjustment process at step S140 shown in FIG. 2.

In the adjustment process at step S140, there is a possibility that the PCS 1 does not drive the target devices 40 such as the automatic brakes a1 and a2 when data regarding the evidence that the driver has already tried the collision avoidance process is stored in the RAM 13 even if the operation instruction to operate the target devices 40 is stored in the RAM 13.

Specifically, in the operation judgment process, when the operation instruction for the automatic brake a1 is stored in the RAM 13 and the data regarding the evidence that the driver has already performed the collision avoidance process is stored in the RAM 13, the PCS 1 judges that the driver has already tried the collision avoidance operation, and halts the operation of the target devices 40 such as the automatic brake a1.

On the other hand, when the operation instruction for the automatic brake a2 is stored in the RAM 13 even if the data regarding the evidence that the driver has already tried the collision avoidance process is stored in the RAM 13, the PCS 1 instructs the target devices 40 as the automatic brake a2 to immediately operate because there is a high possibility that it is difficult for own vehicle to avoid the collision with the target object.

That is, in the adjustment process, although there is a possibility for the PCS 1 to cancel the operation of the automatic brake a1, but the PCS 1 does not halt the operation of the automatic brake a2, namely, instructs the automatic brake a2 to continue the operation.

As a result, in the operation control process at step S150, it is possible for the PCS 1 to decide to give priority to the driver's operation when there is enough time to avoid the collision. On the other hand, when there is not enough time to avoid the collision with high possibility, the PCS 1 instructs the target devices 40 to operate in order to mitigate the damage.

A description will now be given of the operation timing of the PCS 1 with reference to FIG. 5. The operation control process at step S150 will be explained later.

Figure 5:
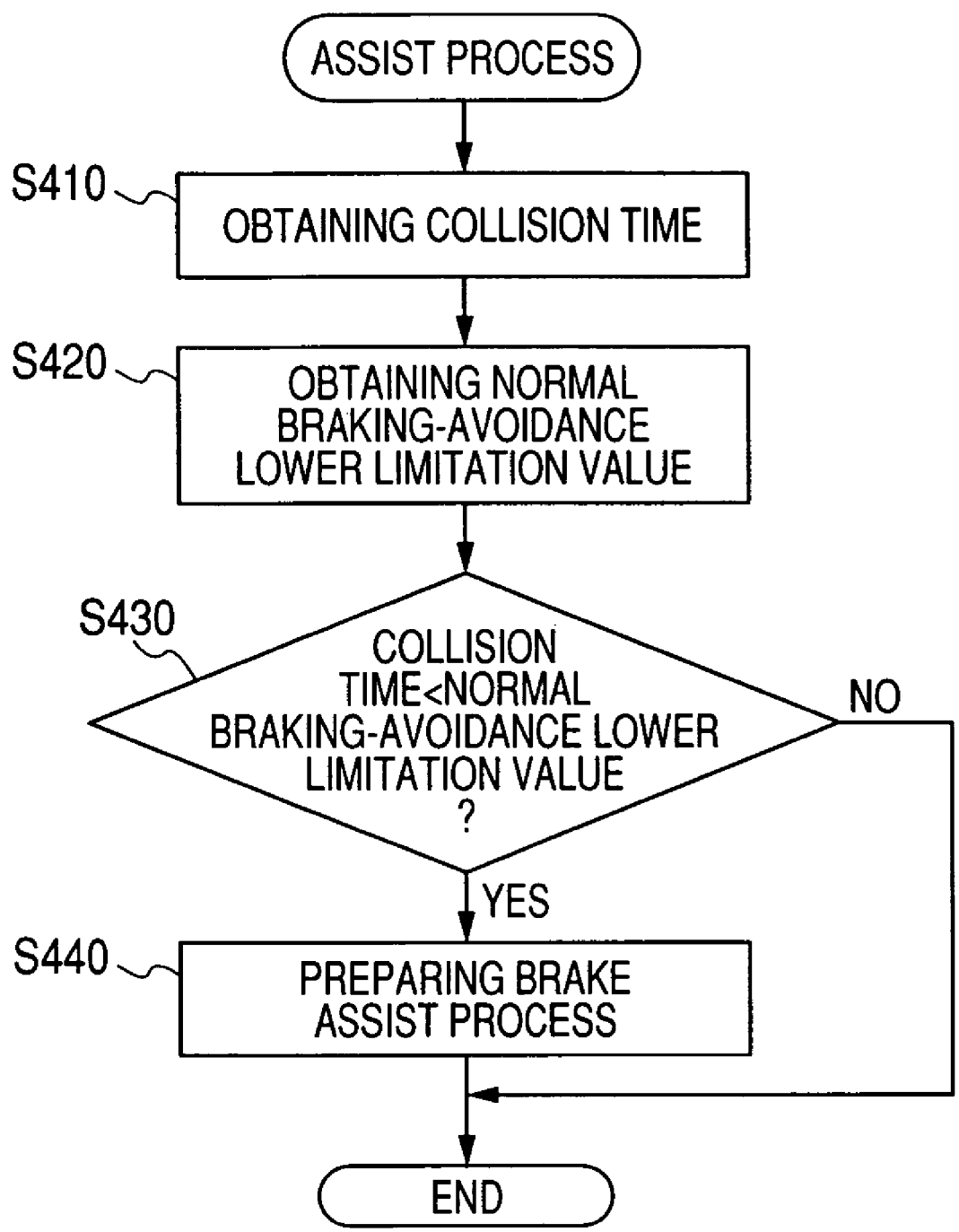
FIG. 5 is a flow chart of a brake assist process performed by the automotive collision mitigation apparatus shown in FIG. 1.

FIG. 5 is a flow chart of the brake assist process performed by the CPU 11 in the collision mitigation controller 10 in the PCS 1 shown in FIG. 1. The assist process is performed by the assist control means according to the present invention.

The assist process is performed every predetermined period (for example, 50 m seconds). It is possible to perform this assist process within the process range from step S130 to step S150 in the collision mitigation process.

Firstly, the PCS 1 reads to obtain the collision time and the normal braking avoidance lower limitation time stored in the RAM 13 at step S410 and step S420. The PCS 1 then judges whether or not the collision time is less than the normal braking-avoidance lower limitation time at step S430.

When the judgment result indicates that the collision time is less than the normal braking-avoidance lower limitation time ("YES" in step S430), the PCS 1 generates an instruction to initiate the PBA (Predictive Brake Assist) for increasing the oil pressure for the brake and for narrowing the interval between the brake pad and the brake disk in the brake. The PCS 1 stores this instruction into the RAM 13 at step S440. The assist process is then completed.

On the other hand, when the judgment result indicates that the collision time is not less than the normal braking-avoidance lower limitation time ("NO" in step S430), the assist process is completed without performing any process.

Next, a description will now be given of the operation control process with reference to FIG. 6. This operation control process shown in FIG. 6 corresponds to step S150 shown in FIG. 2.

In the present invention, the PCS 1 acts as the collision avoidance assist means for performing the processes at steps S560, S570, and S600. The PCS 1 also acts as the collision damage mitigation means for performing the processes at steps S560, S570, S690, and S700.

At step S510 in the operation control process shown in FIG. 6, the PCS 1 inputs the operation judgment result after completion of the adjustment process (at step S140 shown in FIG. 2). The PCS 1 simultaneously performs both the process for the brake assist at steps S520 to S570 and the process for the automatic brake at steps S610 to S700. It is possible to perform the brake assist process of steps S520 to S570 and the automatic brake process of steps S610 to S700 in series.

In the brake assist process, the PCS 1 judges whether or not there is permission to operate the brake assist at step S520. In step S520, the PCS 1 judges whether or not the operation instruction for initiating the PBA is stored in the RAM 13. When the judgment result indicates that the operation instruction has already been stored in the RAM 13, the PCS 1 judges that the operation of the brake assist process is permitted, namely, in ON state. If no operation instruction is stored in the RAM 13, the PCS 1 judges that the operation for the brake assist process is not permitted, namely, in OFF state.

When the operation of the brake assist process is not permitted ("OFF" in step S520), the operation flow goes to step S710 without performing the brake assist process (step S530).

When the execution of the brake assist process is permitted ("ON" in step S520), the PCS 1 (acting as the operation judgment means) further checks the automatic brake a1 operation flag at step S540. This automatic brake a1 operation flag is a flag indicating the permission of executing the automatic brake a1.

When the automatic brake a1 operation flag indicates OFF state ("OFF" in step S540), the PCS 1 (acting as the rear vehicle judgment means, and a forbidding means) further judges whether or not there is any rear vehicle at step S550. That is, the PCS 1 judges whether or not there is any rear vehicle in the image data obtained from the rear-side camera 34 on the traffic lane on which own vehicle runs.

When the judgment result indicates that there is the rear vehicle in the image data ("PRESENCE" at step S550), the PCS 1 requests to perform the brake assist in which the target acceleration speed is set to the value of 1.5 times of the acceleration indicated by the driver's brake pedal operation, and the acceleration gradient or slope is set to −1.5 [G/s], where G is the acceleration of gravity.

At this time, the setting acceleration by the brake assist process is calculated along the acceleration gradient, and the PCS 1 (acting as an assist brake reduction means) then stores the calculation result into the RAM 13 at step S560. The operation flow then progresses to step S710.

On the other hand, when the judgment result indicates that there is no rear vehicle in the image data ("NOT PRESENCE" at step S550), or when the automatic brake a1 operation flag indicates ON state ("ON" at step S540), the PCS 1 requests to perform the brake assist in which the target acceleration speed is set to the value which is 2.0 times of the acceleration indicated by the driver's brake pedal operation, and the acceleration gradient is −2.0 [G/s], where G is the acceleration of gravity. At this time, the setting acceleration by the brake assist process is calculated along the acceleration gradient, and the PCS 1 then stores the calculation result into the RAM 13 at step S570. The operation flow then progresses to step S710.

In the brake assist process, when the automatic brake operates based on the possibility that own vehicle would be struck from behind by the rear vehicle in the case where the automatic brake a1 does not operate and the rear vehicle runs behind own vehicle on the same traffic lane, the PCS 1 sets the braking force for the brake assist to a small value and sets the acceleration gradient for the automatic brake a2 to a small value, when compared with the case where there is no rear vehicle behind own vehicle.

A description will now be given of the automatic brake process.

Firstly, at step S610, the PCS 1 judges whether or not the operation of the automatic brake a2 is permitted. That is, the PCS 1 judges whether or not the operation instruction for the automatic brake a2 has already been stored in the RAM 13. The judgment result indicates that the operation instruction for the automatic brake a2 is stored in the RAM 13, the PCS 1 judges that the operation of the automatic brake a2 is permitted ("ON" at step S610). On the other hand, the judgment result indicates that the operation instruction for the automatic brake a2 is not stored in the RAM 13, the PCS 1 judges that the operation of the automatic brake a2 is not permitted ("OFF" at step S610).

When the judgment result indicates that the operation of the automatic brake a2 is not permitted, namely, in OFF state ("OFF" at step S610), the PCS 1 judges that the state of the operation for the automatic brake a1 at step S620. Like the case of the automatic brake a2, the PCS 1 judges whether or not the operation instruction for the automatic brake a1 is stored in the RAM 13.

The judgment result indicates that the operation of the automatic brake a1 is not permitted, namely, in OFF state ("OFF" at step S620), the PCS 1 sets the automatic brake a1 operation flag to "OFF" at step S620. The PCS 1 judges there is no request to operate the automatic brake a1, and the operation flow progresses to step S701.

On the other hand, the judgment result indicates that the operation of the automatic brake a1 is permitted, namely, in ON state ("ON" at step S620), the PCS 1 judges that the automatic brake a1 has operated, and sets the automatic brake a1 operation flag into "ON" state at step S650.

The PCS 1 requests to operate the automatic brake a1 under the condition in which the target acceleration speed is −0.2 [G] and the acceleration gradient is −2.0 [G/s]. At this time, the PCS 1 calculates the setting acceleration speed for the automatic brake a1 based on the acceleration gradient, and stores the calculation result into the RAM 13 at step S660. The operation flow then progresses to step S710.

On the other hand, the judgment result at step S610 indicates that the operation of the automatic brake a2 is permitted, namely, in ON state ("ON" at step S610), the PCS 1 (acting as the operation judgment means) judges the value of the automatic brake a1 operation flag at step S670.

When the judgment result indicates that the automatic brake a1 operation flag is in OFF state ("OFF" at step S670), the PCS 1 (acting as the rear vehicle judgment means and the forbidding means) judges the presence of the rear vehicle which runs on the traffic lane on which own vehicle also runs at step S680.

When the PCS 1 judges that the rear vehicle is present in the image data ("PRESENCE" at step S680), the PCS 1 requests to drive the automatic brake a2 under the condition in which the target acceleration speed is −0.6 [G] and the acceleration gradient is −1.5 [G/s]. At this time, the PCS 1 (acting as the damage mitigation braking force reduction means) calculates the setting acceleration speed for the automatic brake a2 based on the acceleration gradient, and stores the calculation result into the RAM 13 at step S690. The operation flow then goes to step S710.

On the other hand, at step S680, when the PCS 1 judges that no rear vehicle is present in the image data ("NOT PRESENCE" at step S680), the PCS 1 requests to drive the automatic brake a2 under the condition in which the target acceleration speed is −0.8 [G] and the acceleration gradient is −2.0 [G/s]. At this time, the PCS 1 calculates the setting acceleration speed for the automatic brake a2 based on the acceleration gradient, and stores the calculation result into the RAM 13 at step S700. The operation flow then progresses to step S710.

That is, in the automatic braking process, the PCS 1 sets the braking force (as the absolute value of the target acceleration speed and the acceleration gradient) for the automatic brake a2 to a small value when the automatic brake is driven by the judgment result where there is a possibility in which own vehicle would be struck from behind by the rear vehicle when the automatic brake a1 is not driven and the rear vehicle runs behind own vehicle, as compared with the case where there is no rear vehicle.

By the way, in the process (at step S660 and the like) of calculating the setting acceleration, the PCS 1 performs the operation control process at every 50 ms. When the acceleration gradient is set to −1.5 [G/s], the setting acceleration is increased by −0.075[G] every time the operation control process is performed. In addition, in the case where the operation control process is performed at every 50 ms and the acceleration gradient is set to −2.0 [G/s], the setting acceleration is increased by −0.1 [G] every time the operation control process is performed. When the setting acceleration speed reaches the target acceleration speed, the setting acceleration speed is maintained at the target acceleration speed.

When the brake assist process and the automatic brake process are completed, the PCS 1 performs the target acceleration speed adjustment process at step S710. In this process at step S710, PCS 1 selects a smaller acceleration value (having a large absolute value thereof) in the acceleration values (as the setting accelerations) which are set in the brake assist process and the automatic brake process. The PCS 1 then sets the acceleration (as the setting acceleration: a deceleration) of own vehicle based on the selected acceleration value. For example, when the acceleration is set to −1.5 [G], and the driver requests the acceleration of 0.7 [G], the PCS 1 selects the smaller value, namely, the value of −1.5 [G]. The collision mitigation controller 10 in the PCS 1 transfers the operation instruction based on the selected value of −1.5 [G] to the target devices 40.

In the operation judgment process and the brake control process performed by the PCS 1 as the automotive collision mitigation apparatus according to the embodiment of the present invention described above in detail, the CPU 11 in the automotive collision mitigation controller 10 instructs the target devices 40 to operate in order to assist the driver's collision avoidance operation when the collision time is less than the automatic brake a1 judgment line which is determined in advance.

In order to mitigate the damage generated when own vehicle would collide with the rear vehicle, the CPU 11 in the automotive collision mitigation controller 10 drives the automatic brake a2 when the collision time is not less than the automatic brake a2 judgment line which is less than the automatic brake a1 judgment line.

When it is judged that the automatic brake a1 is not driven in the operation control process, the CPU 11 decreases the braking force for the operation of the automatic brake a2, when compared with the case of the operation of the automatic brake a1.

According to the PCS 1 having the above functions, because there is a possibility that the braking force for the automatic brake a2 is decreased even if the braking is performed by the automatic brake a2 without performing the braking by the automatic brake a1, it is possible to avoid that own vehicle is struck from behind by the rear vehicle when the target devices 40 are driven based on the automatic brake a2.

Because the configuration of the combination of the automatic brake a1 and the automatic brake a2 in the PCS 1 described above enables the brake lamp to light on when the automatic brake a1 is driven, it is possible to inform the warning to the rear vehicle which runs on the same traffic lane of own vehicle before the automatic brake a2 is drive. This warning informs to the driver of the rear vehicle that the brake devices 40 would be driven. Therefore when compared with the warning (for example, only using a buzzer) to the driver of the rear vehicle without using the automatic brake a1, it is possible to efficiently avoid that the own vehicle is struck from behind by the rear vehicle.

In addition, the CPU 11 in the collision mitigation controller 10 instructs the automatic brake a2 to operate at the deceleration speed, which is determined in advance, in the operation judgment process and the brake control process. The CPU 11 then selects the smaller absolute value of the deceleration gradient or the mitigation deceleration, to be used when the mitigation deceleration is set, in order to decrease the braking force.

According to the PCS 1 having the above functions, it is possible to certainly perform the braking for the vehicle at the target deceleration speed.

In addition, the CPU 11 in the automotive collision mitigation controller 10 drives the automatic brake a1 at the assist deceleration, which is set in advance, in the operation judgment process and the operation control process. In this case, the assist deceleration is set to a smaller value than the mitigation deceleration.

According to the PCS 1 described above, it is possible to decrease the braking force of the vehicle rather than the braking force when the automatic brake a1 is driven, as compared with the braking force of the automatic brake a2. Therefore, it is possible to avoid that own vehicle is struck from behind by the rear vehicle even if the automatic brake a1 is driven.

Still further, the CPU 11 in the collision mitigation controller 10 performs the brake assist process in order to increase the braking force when the target devices 40 are driven by the driver when the collision time is less than the predetermined assist threshold value.

The CPU 11 in the automotive collision mitigation controller 10 controls so that the braking force set by the brake assist process is decreased when the judgment result indicates that the automatic brake a1 is not driven in the operation control process, when compared with the case where the judgment result indicates that the automatic brake a1 is driven.

Accordingly, the PCS 1 described above, it is possible to decrease the braking force when the automatic brake a1 is not driven under the condition where the driver operates the braking devices. Therefore, even if the driver operates the brake devices, it is possible to avoid that own vehicle is struck from behind by the rear vehicle.

Still further, the CPU 11 in the automotive collision mitigation controller 10 judges the presence of the rear vehicles based on the detection result of the rear-side camera 34 during the operation control process. The rear vehicles are running behind own vehicle on the same traffic lane. When the judgment result indicates there is no rear vehicle on the same traffic lane, the CPU 11 forbids the operation to decrease the braking force of the brake devices 40.

According to the PCS 1 described above, it is possible to more-forcedly brake the vehicle when there is no rear vehicle behind own vehicle and there is no possibility that own vehicle would be struck from behind by the rear vehicle. This can mitigate the damage generated when own vehicle strikes a forward-driving vehicle or when a collision accident occurs with a forward obstacle.

Still further, the CPU 11 in the automotive collision mitigation controller 10 changes the automatic brake a2 judgment line into a more-large value when it is judged that the automatic brake a1 is not driven in the threshold value calculation process, as compared with the judgment to drive the automatic brake a1.

According to the PCS 1 described above, it is possible to change the automatic brake a2 judgment line into a more-large value so that the initiation of the operation timing of the automatic brake a2 is shortened when the operation to decrease the braking force is performed. This enables the collision damage to be mitigated even if the braking distance becomes longer by decreasing the magnitude of the braking force.

The concept of the present invention is not limited by the embodiment described above. For example, it is possible to change one of the automatic brake a2 and the acceleration speed gradient although the embodiment described above changes both the automatic brake a2 and the acceleration speed gradient based on the automatic brake a1 operation flag and the presence of the rear vehicle.

Still further, in the case where the PCS does not have the capability to detect the presence of the rear vehicle, this PCS almost has the same effect of the PCS 1 according to the embodiment described above by eliminating the processes at step S550 and S680 in the braking control process.

Effects

In the collision mitigation apparatus as another aspect of the present invention, the collision damage mitigation means drives the brake means at a mitigation deceleration which is determined in advance. The damage mitigation braking force reduction means decreases the braking force by selecting a small one from an absolute value of a deceleration gradient and an absolute value of the mitigation deceleration which is used when the mitigation deceleration is set into a smaller value.

According to the collision mitigation apparatus having the above configuration, it is possible to certainly brake own vehicle at the target deceleration.

In the collision mitigation apparatus as another aspect of the present invention, the collision avoidance assist means drives the brake means at an assist deceleration as a deceleration which is determined in advance, and it is so set that the absolute value of the assist deceleration is smaller than that of the mitigation deceleration.

According to the collision mitigation apparatus having the above configuration, it is possible to avoid the collision where own vehicle is struck from behind by the rear vehicle when the collision avoidance assist means operates because it is possible to set the breaking force of the vehicle to a small value when the collision avoidance assist means operates, when compared with the case of performing the collision damage mitigation means.

On the other hand, in another type of the collision mitigation apparatus without having the configuration and functions of the present invention, it is possible to avoid that own vehicle is struck from behind by the rear vehicle by setting the operation time for the collision avoidance assist means to a small value so that own vehicle is not rapidly decelerated even if the collision avoidance assist means operates.

The collision mitigation apparatus as another aspect of the present invention further has an assist control means and an assist braking force reduction means. The assist control means is configured to increase the braking force of the brake means by the driver of the vehicle when the collision time is less than an assist threshold value which is determined in advance. The assist braking force reduction means is configured to decrease the braking force of the assist control means when the operation judgment means judges that the collision avoidance assist means does not drive the brake means, as compared with the judgment where the collision avoidance assist means drives the brake means.

According to the collision mitigation apparatus having the above configuration, it is possible to decrease the braking force when the collision avoidance assist means drives the brake means even if the driver handles the brake means. This can avoid the collision in which own vehicle is struck from behind by the rear vehicle even if the driver handles the brake means.

The collision mitigation apparatus as another aspect of the present invention further has a rear-vehicle judgment means, and a forbidding means. The rear-vehicle judgment means is configured to judge whether or not a rear vehicle runs behind own vehicle based on the detection result of a rear vehicle detection means for detecting the presence of the rear vehicle which is present behind of own vehicle. The forbidding means is configured to forbid the operation of one of the damage mitigation braking force reduction means and the assist breaking force reduction means when the rear-vehicle judgment means judges that there is no rear vehicle.

According to the collision mitigation apparatus having the above configuration, it is possible to brake the vehicle by the strong breaking force because the forbidding means forbids the operation of one of the damage mitigation braking force reduction means and the assist breaking force reduction means when there is no rear vehicle and there is no possibility that own vehicle is struck from behind by the rear vehicle. It is thereby possible to mitigate the damage when own vehicle collides with obstacle.

The collision mitigation apparatus as another aspect of the present invention further has a time changing means. The time changing means is configured to change the damage mitigation time to a large value when the operation judgment means judges that the collision avoidance assist means does not drive the brake means, when compared with the judgment in which the collision avoidance assist means drives the brake means.

According to the collision mitigation apparatus having the above configuration, it is possible to change the damage mitigation time into a large value so that the operation timing of the collision damage mitigation means to an earlier timing when one of the breaking force reduction means (such as the damage mitigation braking force reduction means and the assist breaking force reduction means) is driven. It is thereby possible to reduce the damage generated by the collision even if the breaking distance is expanded by the operation of one of the breaking force reduction means.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A collision mitigation apparatus, mounted to an automobile vehicle, capable of mitigating damage generated when the vehicle collides with obstacles including another vehicle by driving brake means mounted to the vehicle, comprising:

obstacle detection means configured to detect obstacles which are present around own vehicle to which the collision mitigation apparatus is mounted;

collision time calculation means configured to calculate a collision time as an estimated time length until own vehicle collides with the obstacle detected by the obstacle detection means;

collision avoidance assist means configured to drive the brake means in order to assist the collision avoidance operation by a vehicle's driver when the collision time is less than a predetermined assist time which is determined in advance;

collision damage mitigation means configured to drive the brake means in order to mitigate the damage when own vehicle collides with the obstacle when the collision time is less than a predetermined damage mitigation time which is less than the assist time;

operation judgment means configured to judge whether or not the collision avoidance assist means drives the brake means; and damage mitigation braking force reduction means configured to decrease the braking force of the brake means by the collision damage mitigation means when the operation judgment means judges that the collision assist avoidance means does not drive the brake means, as compared with the judgment in which the operation judgment means judges that the collision assist avoidance means drives the brake means.

2. The collision mitigation apparatus according to claim 1, wherein the collision damage mitigation means drives the brake means at a mitigation deceleration which is determined in advance, and the damage mitigation braking force reduction means decreases the braking force by selecting a small one from an absolute value of a deceleration gradient and an absolute value of the mitigation deceleration which is used when the mitigation deceleration is set into a more small value.

3. The collision mitigation apparatus according to claim 2, wherein the collision avoidance assist means drives the brake means at an assist deceleration as a deceleration which is determined in advance, and it is so set that the absolute value of the assist deceleration is smaller than that of the mitigation deceleration.

4. The collision mitigation apparatus according to claim 1, further comprising:

assist control means configured to increase the braking force of the brake means by the driver of the vehicle when the collision time is less than an assist threshold value which is determined in advance; and assist braking force reduction means configured to decrease the braking force of the assist control means when the operation judgment means judges that the collision avoidance assist means does not drive the brake means, as compared with the judgment in which the collision avoidance assist means drives the brake means.

5. The collision mitigation apparatus according to claim 2, further comprising:

assist control means configured to increase the braking force of the brake means by the driver of the vehicle when the collision time is less than an assist threshold value which is determined in advance; and assist braking force reduction means configured to decrease the braking force of the assist control means when the operation judgment means judges that the collision avoidance assist means does not drive the brake means, as compared with the judgment in which the collision avoidance assist means drives the brake means.

6. The collision mitigation apparatus according to claim 3, further comprising:

assist control means configured to increase the braking force of the brake means by the driver of the vehicle when the collision time is less than an assist threshold value which is determined in advance; and assist braking force reduction means configured to decrease the braking force of the assist control means when the operation judgment means judges that the collision avoidance assist means does not drive the brake means, as compared with the judgment in which the collision avoidance assist means drives the brake means.

7. The collision mitigation apparatus according to claim 4, further comprising:

rear-vehicle judgment means configured to judge whether or not a rear vehicle is present based on the detection result of a rear vehicle detection means for detecting the presence of the rear vehicle which is present behind of own vehicle; and forbidding means configured to forbid the operation of one of the damage mitigation braking force reduction means and the assist breaking force reduction means when the rear-vehicle judgment means judges that there is no rear vehicle.

8. The collision mitigation apparatus according to claim 5, further comprising:

rear-vehicle judgment means configured to judge whether or not a rear vehicle is present based on the detection result of a rear vehicle detection means for detecting the presence of the rear vehicle which is present behind of own vehicle; and forbidding means configured to forbid the operation of one of the damage mitigation braking force reduction means and the assist breaking force reduction means when the rear-vehicle judgment means judges that there is no rear vehicle.

9. The collision mitigation apparatus according to claim 6, further comprising:

rear-vehicle judgment means configured to judge whether or not a rear vehicle is present based on the detection result of a rear vehicle detection means for detecting the presence of the rear vehicle which is present behind of own vehicle; and forbidding means configured to forbid the operation of one of the damage mitigation braking force reduction means and the assist breaking force reduction means when the rear-vehicle judgment means judges that there is no rear vehicle.

10. The collision mitigation apparatus according to claim 1, further comprising time changing means configured to change the damage mitigation time to a large value when the operation judgment means judges that the collision avoidance assist means does not drive the brake means, as compared with the judgment in which the collision avoidance assist means drives the brake means.

11. The collision mitigation apparatus according to claim 2, further comprising time changing means configured to change the damage mitigation time to a large value when the operation judgment means judges that the collision avoidance assist means does not drive the brake means, as compared with the judgment in which the collision avoidance assist means drives the brake means.

12. The collision mitigation apparatus according to claim 3, further comprising time changing means configured to change the damage mitigation time to a large value when the operation judgment means judges that the collision avoidance assist means does not drive the brake means, as compared with the judgment in which the collision avoidance assist means drives the brake means.

* * * * *